United States Patent Office 3,255,265
Patented June 7, 1966

3,255,265
CATALYTIC PROCESS FOR THE PREPARATION OF TERTIARY ALKYL HALIDES FROM TERTIARY OLEFINS
William L. Walsh, Glenshaw, Pa., assignor to Gulf Research & Development Company, Pittsburgh, Pa., a corporation of Delaware
No Drawing. Filed June 18, 1962, Ser. No. 202,958
8 Claims. (Cl. 260—663)

This application is a continuation-in-part of copending application Serial Number 25,502, filed April 29, 1960, now abandoned.

This invention relates to an improved catalytic process for the preparation of tertiary alkyl halides from tertiary olefins.

In accordance with this invention a tertiary olefin and a hydrogen halide are contacted in the presence of a catalyst comprising aryl sulfonic acid and amine, with the aryl sulfonic acid present in molal excess over amine, at a temperature between about 0° C. and 100° C. and a pressure between about atmospheric and 150 pounds per square inch gauge to form the corresponding tertiary alkyl halide. Although amines exhibit substantially no catalytic activity for this reaction when employed in the absence of sulfonic acid, and amines present in molal excess over sulfonic acid reduce the catalytic activity of the sulfonic acid, the catalytic combination of amine and sulfonic acid of this invention wherein sulfonic acid is present in molal excess over amine increases the rate of hydrohalogenation of tertiary olefins substantially, especially during the early stages of the reaction wherein it approximately doubles the rate of the conversion of tertiary olefin to tertiary alkyl halide as compared to the reaction rate achievable when employing sulfonic acid alone as a catalyst.

The sulfonic acid component of the catalyst can have one or two sulfonic acid groups attached to an aromatic ring. The aromatic ring advantageously also has groups attached to it which may be alkyl or aryl or both but preferably alkyl. In all, the ring should have between 1 and 20 carbon atoms attached to it in order to render the compound soluble in the hydrocarbon reaction medium. The number of such alkyl or aryl groups can vary between 1 and 4 depending upon their size. Advantageously, an alkyl or aryl group should be either meta or para to a sulfonic acid group to avoid stearic hindrance. Examples of suitable sulfonic acids are dodecylbenzene sulfonic acid, dihexylbenzene sulfonic acid, toluene sulfonic acid, tributylbenzene sulfonic acid, dihexylbenzene sulfonic acid, etc.

The sulfonic acid can also be a condensed ring compound with the second ring being saturated or unsaturated. Such a compound can contain one or two sulfonic acid groups and as many as six alkyl or aryl groups.

The amine component of the catalyst can be either an aliphatic or aromatic amine. It can contain one or more amino groups. If the amino groups are attached to an aromatic ring there can be as many as three amino groups on a single ring compound but two are preferred. Where two amino groups are attached to the aromatic ring they are advantageously in the para position. Alkyl and aryl groups, preferably alkyl, can be attached to the aromatic ring. In all, there should be between 1 and 12 carbon atoms attached to the ring of an aromatic amine to render it miscible in the hydrocarbon reaction medium.

If a non-heterocyclic nitrogen aromatic amino compound is employed, the amino group can be attached to a single ring or a double condensed ring wherein the second ring is either saturated or unsaturated. In the case of a condensed ring compound there can be as many as 4 or 5 amino groups. Also, a heterocyclic nitrogen amine compound can be employed.

The amount of sulfonic acid and amine employed can vary within wide limits. For example, the amount of sulfonic acid can vary between 0.05 and 1.0 mole percent of the tertiary olefins charged with a preferred concentration between 0.18 and 0.75 mole percent. The amine concentration can vary from 0.001 to slightly less than 0.50 mole percent of the tertiary olefins charged with a preferred concentration between 0.02 and 0.15. A molal excess of sulfonic acid over amine is employed. Of course, with whichever catalyst composition is employed conversion is aided by increasing the ratio of catalyst to reactants.

The amine and sulfonic acid components of the catalyst are advantageously intermixed with each other before being placed onstream and interaction between the two is permitted to proceed to completion. In this manner the amine is permitted to interact with the sulfonic acid prior to exposure of the amine to the hydrogen halide reactant. In this manner, also, the tertiary olefin and hydrogen halide reactants are exposed to the combination catalyst of this invention during the entire course of the hydrohalogenation reaction. In an advantageous embodiment, either the amine or the sulfonic acid catalytic component is first dispersed in the olefin reactant and the other catalyst component is then added and any interaction is allowed to substantially go to completion. Hydrogen chloride or other hydrogen halide is then contacted with the resulting mixture of catalyst and olefin reactant. Again, the combination catalyst of this invention is present from the very beginning of exposure of tertiary olefin to hydrogen halide. One reason it is important that the amine interact with the sulfonic acid prior to exposure to reactant acids such as hydrogen chloride is that hydrogen chloride salts are insoluble in hydrocarbon whereas sulfonic acid-amine salts are not only quite soluble in hydrocarbon but are even more soluble in aliphatic chloride, which is the reaction product.

The catalyst components are chosen so that the catalyst, reactants and product form a mutually miscible single phase system. Since the system tends to become more mutually soluble as more product is formed it is desirable during startup to charge an alkyl halide compound, such as the product compound, to the reaction system.

Although reaction pressures can vary from about 0 to 150 pounds per square inch gauge or more, a primary advantage of the catalyst of this invention is that pressures at or near atmospheric can be employed at room temperatures while obtaining high yields of tertiary chlorides, whereas pressures above this range are necessary to obtain comparable conversions in the absence of a catalyst.

The reaction temperature can vary between 0° C. and 100° C. or more with a preferred temperature between 25° C. and 50° C. The lower temperatures promote a higher equilibrium yield of the tertiary halides whereas the higher temperatures promote a faster reaction.

The charge stock is not limited to a particular tertiary olefin and can contain, for example, any $C_4$ to $C_{20}$ tertiary olefin or any mixture containing these tertiary olefins. A tertiary olefin is an olefin which upon hydrohalogenation forms a tertiary halide. The preferred tertiary olefins contain between 5 and 12 carbon atoms. The presence of inert materials such as paraffins, naphthenes, aromatics, alcohols, etc. does not harm the reaction.

The residence or contact time between reactants and catalyst can vary between about 0.1 and 20 hours or more. However, in order to take substantial advantage of the high initial reaction rates achievable with the catalysts of this invention a residence time of no longer than about 1 to 2 hours should be employed since at higher residence times equilibrium conversion is achieved with a sulfonic acid catalyst alone.

The hydrogen halides charged can include hydrogen chloride, hydrogen bromide, hydrogen iodide and hydrogen fluoride.

*Example 1*

The results of certain tests made to illustrate this invention are shown in Table 1. These tests were made batchwise and in each test amine was first added to olefin reactant followed by addition of sulfonic acid. Thereupon, hydrogen chloride was added to the olefin-amine-sulfonic acid mixture.

of these tests HCl was employed in excess quantity as evidenced by continual observation of excess HCl passing through an exit gas bubbler. The reactor was cooled during each test to maintain the desired temperature.

The condition in all of the tests of this example were substantially uniform except for the catalyst employed. The catalyst employed in Test 9 was dodecyl benzene sulfonic acid, with no amine added. The catalyst employed in Test 10 was dodecyl benzene sulfonic acid neutralized with a molal excess of amine. The catalyst employed in Test 11 was dodecyl benzene sulfonic acid to which only three drops of an amine were added so that the sulfonic acid was present in molal excess over amine. The results of these tests are shown in Table 2.

TABLE 1

| Test Number | 1 | 2 | 3 | 4 | 5 | 6 | 7 | 8 |
|---|---|---|---|---|---|---|---|---|
| Charge stock | C$_5$ FCC cut | 2-methyl-butene-2 | 2-methyl-butene-2 | 2-methyl-butene-2 + pentene-2. | C$_5$ blend | C$_5$ cut | C$_6$ blend | |
| Sample weight, grams | 286 | 31.8 | 66.20 | 140 | 357 | 255.5 | 321 | 1,500. |
| Percent t-olefins in sample | 35 | 95 | 95 | 50 | 47 | 35 | 83 | 83. |
| Weight t-olefins in sample, grams | 100 | 30 | 63 | 70 | 168 | 89 | 266 | 1,245. |
| Catalyst: Dodecyl benzene sulfonic acid, grams | 0 | 0 | 0 | 3.5 | 3.0 | 3.0 | 3.0 | 16. |
| Dibutyl-p-phenylene diamine, grams | 0 | 0 | 0 | 0 | 0.2 | 0.34 | 3 drops per gallon | |
| Dry HCl | Excess | Excess | Excess | Excess | Excess | Excess | Excess | 15.4 moles absorbed. |
| Conditions: | | | | | | | | |
| Pressure, p.s.i.g. | 9-13 | 0 | 0 | 0 | 8-13 | 9-16 | 0 | 0. |
| Temperature, °C | 25 | 96 | 340 | 26-38 | 28-41 | 27-34 | 23-34 | 27-37. |
| Time, hours | 1 | 1 | 1.5 | 2.5 | 3 | 7 | 5 | 6. |
| Yields: | | | | | | | | |
| Weight percent t-chlorides (based on t-olefins) | 0 | 14.4 | 77.9 | | | | | |
| Weight percent t-chlorides + contained t-olefins (not more than 15 percent being contained t-olefins) | 0 | | 88.2 | 33 | 75 | 95 | 88 | 85. |

Tests 1, 2 and 3 illustrate the results of tests made in the absence of a catalyst and at atmospheric pressure. The yields of tertiary amyl chlorides at reaction temperatures of 25° C., 96° C. and 340° C. were 0, 14.4 and 77.9 weight percent of the tertiary olefins in the charge stock, respectively. It is seen that in the absence of a catalyst high reaction temperatures are necessary at atmospheric pressure to achieve reasonable conversions.

As shown by Test 4, the use of sulfonic acid alone as a catalyst resulted in a yield of only 33 weight percent tertiary chlorides plus contained tertiary olefins at atmospheric pressure and a temperature between 26° C. and 38° C. About 10 percent of the yield comprised contained tertiary olefins.

Tests 5, 6, 7 and 8 show that the use of a combined sulfonic acid-amine catalyst results in the production at room temperature of high yields of tertiary amyl and hexyl chlorides plus a small amount of unreacted tertiary olefins which distill over with the chlorides. It is noted that the recovery of some tertiary olefin which distills over with the alkyl chlorides renders the process of this invention especially useful for the separation of tertiary olefin from close boiling mixtures.

In addition to the tests illustrated in Table 1, a further test was conducted in which butyl amine was substituted for dibutyl-p-phenylene diamine. In still another test, aniline was employed in place of dibutyl-p-phenylene diamine. The results obtained employing each of these latter two amines were comparable to those obtained by the use of dibutyl-p-phenylene diamine.

*Example 2*

In each of three additional tests, designated as Tests 9, 10 and 11 in Table 2, a diisobutylene mixture, containing 60 mole percent 2,4,4-trimethylpentene-1 and 40 mole percent 2,4,4-trimethylpentene-2, was reacted with excess anhydrous HCl to produce the corresponding tertiary chloride, 2-chloro 2,4,4-trimethylpentane. Throughout each The yields shown in Table 2 were determined by removing a sample from the reactor by means of a pipette at the reaction times indicated and, without separation of the sample into its components, injecting the entire sample mixture into a gas chromatography column for analysis.

TABLE 2

| Test Number | 9 | 10 | 11 |
|---|---|---|---|
| Charge: | | | |
| Diisobutylene | 349 grams | 350 grams | 349.5 grams. |
| HCl | Excess | Excess | Excess. |
| Catalyst: | | | |
| Dodecyl benzene sulfonic acid | 3.5 grams | 3.5 grams (0.0107 moles). | 3.5 grams. |
| Amine | | 2 grams triethyl amine (0.02 moles). | 3 drops dibutyl-p-phenylene diamine. |
| Temperature | 32°–35° C | 30°–34° C | 32°–36° C. |
| Pressure | Atmospheric | Atmospheric | Atmospheric. |
| Yield: Weight percent t-octyl chloride based on olefin charge after a total reaction time of— | | | |
| 20 minutes | 5.0 | 2.1 | 9.6. |
| 40 minutes | 15.2 | 7.9 | 39.7. |

Table 2 shows that when only a small amount of amine is added to the dodecyl benzene sulfonic acid catalyst so that the sulfonic acid is present in molal excess over amine the reaction rate is increased 2 to 2.5-fold in the time periods shown, as compared to the use of the dodecyl benzene sulfonic acid catalyst without amine. Table 2 further shows that when the dodecyl benzene sulfonic acid catalyst is neutralized by the presence of a molal excess of amine the reaction rate for the production of t-octyl chloride is substantially reduced in half in the time periods shown, as compared to the use of the dodecyl benzene sulfonic acid catalyst without amine.

Example 3

In each of three additional tests, designated as Tests 12, 13 and 14 in Table 3, a diisobutylene mixture containing 20 mole percent 2,4,4-trimethylpentene-2 and 80 mole percent 2,4,4-trimethylpentene-1 was reacted with excess anhydrous HCl to produce the corresponding tertiary chloride.

A different catalyst was employed in each of the tests of this example. The catalyst employed in Test 12 was dodecyl benzene sulfonic acid, with no amine added. The catalyst employed in Test 13 was dodecyl benzene sulfonic acid neutralized with a molal excess of amine. The catalyst employed in Test 14 was dodecyl benzene sulfonic acid to which only three drops of an amine were added so that the sulfonic acid was present in molal excess over amine. These tests are illustrated in Table 3. The yields shown in Table 3 were determined by removing a sample from the reaction medium and injecting the sample without separating it into its component parts into a gas chromatography column for analysis.

TABLE 3

| Test Number | 12 | 13 | 14 |
| --- | --- | --- | --- |
| Charge: | | | |
| Diisobutylene | 351 grams | 351 grams | 355 grams. |
| HCl | Excess | Excess | Excess. |
| Catalyst: | | | |
| Dodecyl benzene sulfonic acid. | 3.5 grams | 3.5 grams (0.0107 moles) | 3.5 grams. |
| Amine | | 2 grams triethyl amine (0.02 moles). | 3 drops dibutyl-p-phenylene diamine. |
| Temperature | 36°–41° C | 26°–41° C | 34°–41° C. |
| Pressure | Atmospheric | Atmospheric | Atmospheric. |
| Yield: Weight percent t-octyl chloride based on olefin charge after a total reaction time of— | | | |
| 20 minutes | 4.1 | 2.1 | 12.7. |
| 40 minutes | 17.2 | 13.5 | 24.8. |
| 60 minutes | 27.6 | | |
| 80 minutes | 46.4 | | |
| 100 minutes | 63.4 | | |
| 120 minutes | 77.2 | 73.3 | 79.4. |

Table 3 shows that when the dodecyl benzene sulfonic acid catalyst is neutralized by a molal excess of amine the reaction rate for the production of t-octyl chloride is lowered, as compared to the use of dodecyl benzene sulfonic acid catalyst without amine. However, when only a small amount of amine is added to the dodecyl benzene sulfonic acid catalyst so that the sulfonic acid is present in molal axcess over amine the reaction rate is increased, especially in the early stages of the reaction, as compared to the use of dodecyl benzene sulfonic acid catalyst without amine.

Table 3 shows that the maximum advantage of the catalytic process of this invention is achieved early in the reaction before equilibrium conversions are ordinarily approached. It is noted that lower tertiary olefins, such as $C_5$ tertiary olefins, undergo hydrohalogenation at a much slower rate than diisobutylene when employing a catalyst comprising sulfonic acid alone, as shown in Test 4, Table 1, and therefore the advantageous effect of the combination catalyst of this invention is even more pronounced during the hydrohalogenation of lower molecular weight tertiary olefins.

The dual catalyst of this invention can be employed in a process for the separation of tertiary olefin from a mixture containing tertiary olefin together with other close boiling hydrocarbon. In such a separation process the mixture is reacted with a hydrogen halide, such as hydrogen chloride, in the presence of the sulfonic acid-amine catalyst of this invention. Unreacted hydrohalogen is removed and recycled to the hydrohalogenation unit. The tertiary alkyl halides together with a minor amount of accompanying tertiary olefin are then removed from the remaining unreacted charge stock by distillation and are sent through a heating zone wherein the tertiary halides are decomposed into hydrogen halide and the tertiary olefin. Hydrogen halide is removed and recycled to the hydrohalogenation unit. The tertiary olefins are removed from undecomposed tertiary alkyl halides which are recycled to the heating zone.

Various changes and modifications may be made without departing from the spirit of this invention and the scope thereof as defined in the following claims.

I claim:

1. A process comprising contacting tertiary olefin and hydrogen halide at a temperature between about 0° C. and 100° C. and a pressure between about atmospheric and 150 pounds per square inch gauge in the presence of a combination catalyst comprising aryl sulfonic acid and dibutyl-p-phenylene diamine, said combination catalyst containing aryl sulfonic acid in molal excess over amine, said process converting tertiary olefin to tertiary alkyl halide, said amine increasing the rate of conversion of tertiary olefin to tertiary alkyl halide as compared to the conversion rate when employing said aryl sulfonic acid alone as a catalyst.

2. A process comprising contacting tertiary olefin and hydrogen halide at a temperature between about 0° C. and 100° C. and a pressure between about atmospheric and 150 pounds per square inch gauge in the presence of a combination catalyst comprising aryl sulfonic acid and butyl amine, said combination catalyst containing aromatic sulfonic acid in molal excess over amine, said process converting tertiary olefin to tertiary alkyl halide, said amine increasing the rate of conversion of tertiary olefin to tertiary alkyl halide as compared to the conversion rate when employing said aryl sulfonic acid alone as a catalyst.

3. A process comprising contacting tertiary olefin and hydrogen chloride at a temperature between about 0° C. and 100° C. and a pressure between about atmospheric and 150 pounds per square inch gauge in the presence of a catalyst comprising dodecyl benzene sulfonic acid and dibutyl-p-phenylene diamine, the dodecyl benzene sulfonic acid being in molal excess over dibutyl-p-phenylene diamine and said sulfonic acid and diamine having been intermixed prior to exposure of the diamine to hydrogen chloride.

4. A process comprising contacting tertiary olefin and hydrogen chloride at a temperature between about 0° C. and 100° C. and a pressure between about atmospheric and 150 pounds per square inch gauge in the presence of a catalyst comprising dodecyl benzene sulfonic acid and dibutyl-p-phenylene diamine for a time duration between 0.1 and 2 hours, the dodecyl benzene sulfonic acid being in molal excess over dibutyl-p-phenylene diamine.

5. A process comprising contacting tertiary olefin and hydrogen halide at a temperature between about 0° C. and 100° C. and a pressure between about atmospheric and 150 pounds per square inch gauge in the presence of a combination catalyst comprising aryl sulfonic acid and aniline, said combination catalyst containing aryl sulfonic acid in molal excess over aniline, said aryl sulfonic acid and aniline combination catalyst being present from the beginning of exposure of tertiary olefin to hydrogen halide, said process converting tertiary olefin to tertiary alkyl halide, said aniline increasing the rate of conversion of tertiary olefin to tertiary alkyl halide as compared to the conversion rate when employing said aryl sulfonic acid alone as a catalyst.

6. A process comprising contacting tertiary olefin and hydrogen halide at a temperature between about 0° C. and 100° C. and a pressure between about atmospheric and 150 pounds per square inch gauge in the presence of a combination catalyst comprising aryl sulfonic acid and an aniline derivative having between 1 and 12 carbon atoms attached to the ring in substituent form selected from the group consisting of alkyl and aryl substituents, said combination catalyst containing aryl sulfonic acid in molal excess over said aniline derivative, said aryl sulfonic acid and said aniline derivative combination catalyst being present from the beginning of exposure of tertiary olefin to hydrogen halide, said process converting tertiary olefin to tertiary alkyl halide, said aniline derivative increasing the rate conversion of tertiary olefin to tertiary alkyl halide as compared to the conversion rate when employing said aryl sulfonic acid alone as a catalyst.

7. A process comprising contacting tertiary olefin and hydrogen halide at a temperature between about 0° C. and 100° C. and a pressure between about atmospheric and 150 pounds per square inch gauge in the presence of a combination catalyst comprising aryl sulfonic acid and a p-phenylene diamine derivative having between 1 and 12 ring-attached carbon atoms in substituent form selected from the group consisting of alkyl and aryl substituents, said combination catalyst containing aryl sulfonic acid in molal excess over said p-phenylene diamine derivative, said aryl sulfonic acid and said p-phenylene diamine derivative combination catalyst being present from the beginning of exposure of tertiary olefin to hydrogen halide, said process converting tertiary olefin to tertiary alkyl halide, said p-phenylene diamine derivative increasing the rate of conversion of tertiary olefin to tertiary alkyl halide as compared to the conversion rate when employing said aryl sulfonic acid alone as a catalyst.

8. A process comprising contacting tertiary olefin and hydrogen halide at a temperature between about 0° C. and 100° C. and a pressure between about atmospheric and 150 pounds per square inch gauge in the presence of a combination catalyst comprising aryl sulfonic acid and p-phenylene diamine, said combination catalyst containing aryl sulfonic acid in molal excess over said p-phenylene diamine, said aryl sulfonic acid and said p-phenylene diamine combination catalyst being present from the beginning of exposure of tertiary olefin to hydrogen halide, said process converting tertiary olefin to tertiary alkyl halide, said p-phenylene diamine increasing the rate of conversion of tertiary olefin to tertiary alkyl halide as compared to the conversion rate when employing said aryl sulfonic acid alone as a catalyst.

References Cited by the Examiner
UNITED STATES PATENTS

| | | | |
|---|---|---|---|
| 2,573,695 | 11/1951 | Dolnick et al. | 260—663 |
| 2,739,990 | 3/1956 | Chipman | 260—663 |

LEON ZITVER, *Primary Examiner.*

ALPHONSO D. SULLIVAN, DAN D. HORWITZ,
*Examiners.*

J. W. WILLIAMS, *Assistant Examiner.*